United States Patent

Ruthroff

[15] 3,651,429

[45] Mar. 21, 1972

[54] MODULATOR COMPENSATED FOR VARYING MODULATING SIGNAL LEVEL

[72] Inventor: Clyde Leslie Ruthroff, Holmdel, N.J.

[73] Assignee: Bell Telephone Laboratories, Incorporated, Murray Hill, Berkeley Heights,, N.J.

[22] Filed: Dec. 9, 1970

[21] Appl. No.: 96,346

[52] U.S. Cl. ..........................................332/18, 325/147

[51] Int. Cl. ..........................................H03c 3/04

[58] Field of Search ..................332/16, 18, 19; 325/46, 145, 325/147, 187

[56] References Cited

UNITED STATES PATENTS

| | | | |
|---|---|---|---|
| 3,238,456 | 3/1966 | Greefkes | 332/19 X |
| 3,258,694 | 6/1966 | Shepherd | 325/145 |
| 3,260,964 | 7/1966 | Whitehead et al. | 332/18 X |
| 3,486,134 | 12/1969 | Seidel | 332/19 |

*Primary Examiner*—Alfred L. Brody
*Attorney*—R. J. Guenther and E. W. Adams, Jr.

[57] ABSTRACT

A phase or frequency modulator of the quadrature or Armstrong type is modified such that the amplitude of the quadrature component will be reduced in proportion to any reduction in the power of the modulating signal so that the modulation index remains constant despite variation in the level of the modulating signal.

7 Claims, 3 Drawing Figures

INVENTOR
C. L. RUTHROFF
BY Ray M. Porter Jr.
ATTORNEY

MODULATOR COMPENSATED FOR VARYING MODULATING SIGNAL LEVEL

BACKGROUND OF THE INVENTION

This invention relates to phase and frequency modulators, and more particularly to a phase or frequency modulator which adapts to a varying level of modulating intelligence signal level in order to maintain a constant modulation index.

Since the differences between those types of modulation sometimes referred to in the art as "phase modulation" and those referred to as "frequency modulation" are immaterial for the purposes of the present invention, the term "phase modulation" will be used herein exclusively with the understanding that the principles of the invention apply as well to corresponding aspects of frequency modulation.

It is a fundamental characteristic of phase modulated signals that the phase deviation and the modulation index are proportional to the amplitude of the modulating signal. Design considerations which need not be discussed in detail here usually determine an optimum value for the modulation index in a given transmission situation which value must thereafter be held constant. Thus, it is necessary for the modulating signal to have a relatively constant amplitude at the point at which it is applied to the modulator. However, in applications in which a number of signal channels are appropriately combined into a composite modulating signal, the level of the composite signal depends upon how many of the individual channels actually contain signal intelligence at a particular moment. In certain practical applications the number of such channels in actual use at a particular time may vary widely. Thus, when the composite signal is applied as phase modulation to a carrier, the modulation index would be subject to wide and undesirable variations. Prior practice has attempted to alleviate these variations by first applying the composite signal to a gain leveling amplifier. However, because of the wide bandwidth and large level variations, a suitable level control amplifier is unduly complicated and expensive.

SUMMARY OF THE INVENTION

In accordance with the present invention it has been recognized that a very simple adaptation of one of the fundamental forms of the phase modulator schemes will produce a modulator that automatically compensates for varying modulating signal levels. In particular, the modulator takes the form of a quadrature modulator often known as the Armstrong modulator. It will be shown that reducing the amplitude of the quadrature signal in proportion to any reduction in the power of the modulating signal will maintain a constant modulation index. The circuit modifications required are extremely simple, and one particular embodiment need comprise no more than a plurality of properly connected diodes, one of which derives an indication of the power level of the modulating signal and another of which regulates the quadrature component in response to the output of the first diode.

DETAILED DESCRIPTION

Figure 1:
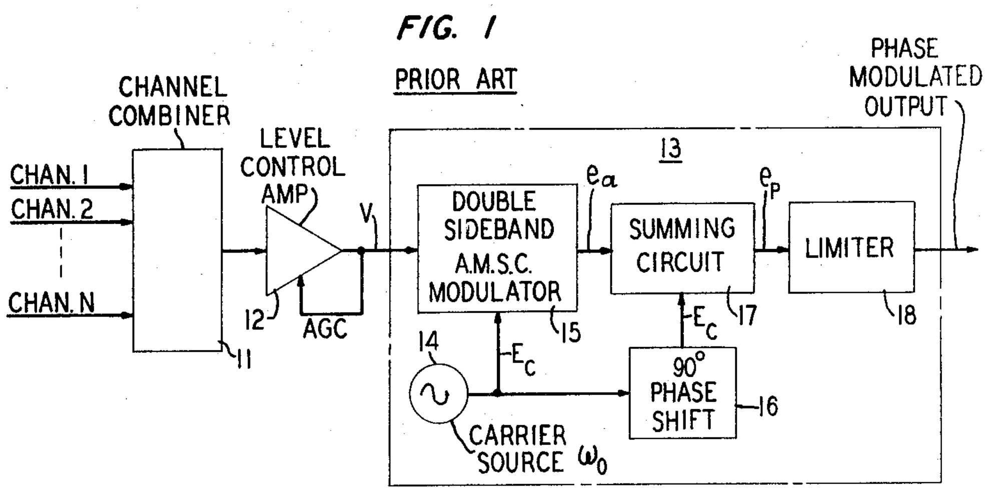
FIG. 1 PRIOR ART
FIG. 1 represents a typical phase modulation system in accordance with the prior art and is given both for the purpose of comparison and for deriving certain mathematical relationships appropriate to an understanding of the invention.

Referring more particularly to FIG. 1, a plurality of individual channels 1 through N are shown applied to a channel combiner 11. For the purpose of illustration each channel is assumed to be a broadband phase or frequency modulated signal, having its own carrier, amplitude and frequency assignment. For example, each may comprise an individual video signal, a broadband data signal, or a multiplicity of telephone signals, all of which may or may not be present at any given time. The function of channel combiner 11 need only be broadly defined as that of assembling the intelligence of each of the individual channels in a single frequency spectrum in the form known to the art as a "baseband" signal extending from a few Hz. to about $10^8$ Hz. Thus, the output of combiner 11 can be expressed as $$v=E_o \sum_{1}^{N} e_n \cos \omega_n t \qquad (1)$$

where $\omega_n$ is frequency of the total or baseband modulating signal which can be expressed as $$\omega_n = npt + \phi_n \qquad (1a)$$

in which

- $np$ are the individual angular frequency assignments of the channels
- $n$ being any integer,
- $\phi_n$ are the individual intelligence modulations expressed as phase modulation, and where

- $N$ is the number of channels,
- $e_n$ are the amplitudes of the individual intelligence signals of each channel and

- $E_o$ is the amplitude factor of the combiner output.

Obviously if the amplitude $e_n$ of one or more of the channels drops appreciably or is zero because that channel has faded or is not in use, the amplitude of $v$ will also drop.

The signal $v$ is applied through amplifier 12, the function of which will be described hereinafter, to phase modulator circuit 13. Circuit 13 is a conventional and familiar quadrature modulator of the type originally disclosed by E. H. Armstrong in "A Method of Reducing Disturbances in Radio Signalling by a System of Frequency Modulation" in the Proceedings of the IRE, Vol. 24, No. 5, May 1936 at page 689 or as described in any standard textbook such as "Modulation Theory" by H. S. Black (1953), pages 206–208.

Typically, the output from a crystal controlled carrier source 14 is divided into two parts, each of which can be designated $E_c \cos \omega_o t$ where $E_c$ is amplitude of the carrier and $\omega_o t$ is its frequency. One part thereof comprises a carrier upon which the modulating signal $v$ from combiner 11 is modulated in a double sideband amplitude modulated suppressed carrier modulator 15 (also referred to as a product modulator) having an output which can be defined $$e_a = kE_c\, v \cos \omega_o t \qquad (2)$$

where $k$ is the amplitude factor of the modulator. The other part from source 14 is shifted by 90° by phase shifter 16 so that it can be designated $E_c \sin \omega_o t$ and is then added to the sidebands from modulator 15 in a summing circuit 17 to become $$e_p = E_c \sin \omega_o t + KE_c\, v \cos \omega_o t\,. \qquad (3)$$

Neglecting residual amplitude modulation, which is removed by limiter 18, equation (3) may be reduced as shown in detail in the aforementioned H. S. Black textbook to $$e_p \approx E_c \sin [\omega_o t + k\, v\,]. \qquad (4)$$

Substituting equation (1) in equation (4) leads to $$e_p \approx E_c \sin \left[\omega_o t + kE_o \sum_{1}^{N} e_n \cos \omega_n t\right]. \qquad (5)$$

It will be recognized that equation (5) is in the usual form of a phase modulated wave having a root-mean-square (RMS) phase deviation given by the expression $$\frac{kE_o}{\sqrt{2}} \left[\sum_{1}^{N} e_n^2\right]^{1/2}. \qquad (6)$$

It is thus apparent that variations in the sum $$\left[\sum_1^N e_n^2\right]^{1/2}$$

will have profound and undesirable effects upon the index of modulation. For this reason the prior art has attempted to incorporate an automatic gain control function in amplifier 12 to maintain the RMS level of modulating signal $v$ more or less constant. However, when $v$ has wide variations in amplitude and is of wide frequency band as in the baseband application of interest to the present invention, a simple automatic gain control amplifier is incapable of maintaining the gain across the required bandwidth.

Figure 2:
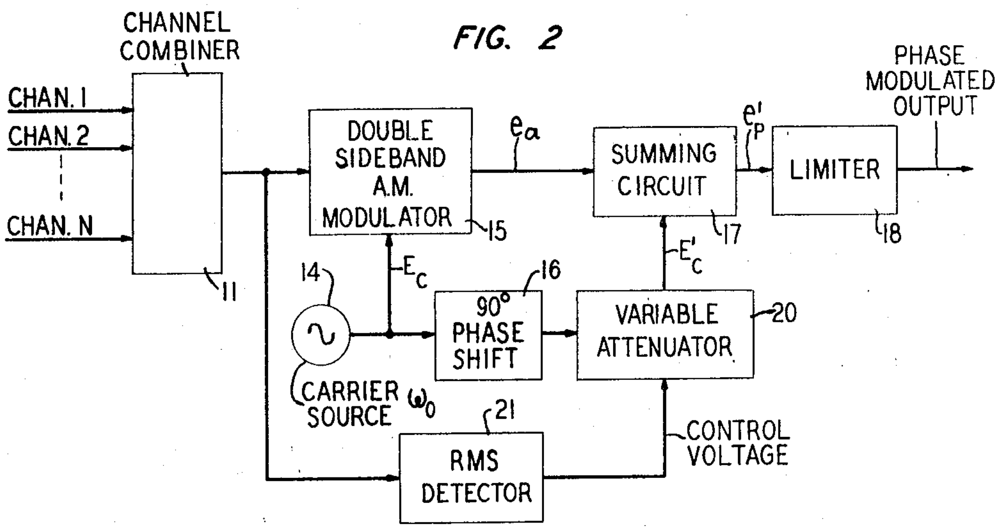
FIG. 2 illustrates the modulator modifications in accordance with the invention.

The present invention is based upon the recognition that the modulating index is also a function of the ratio between the portion of the carrier signal applied to modulator 15 and the portion thereof applied to summing circuit 17. Referring, therefore, to FIG. 2, assume that the signal $E_c$ applied to modulator 15 is unity and that the signal applied to circuit 17 is $E'_c$.

Equation (5) then reduces to $$e'_p \approx E'_c \sin\left[\omega_o t + \frac{kE_o}{E'_c}\sum_1^N e_n \cos \omega_n t\right]. \qquad (7)$$

In accordance with the invention, $E'_c$ is then caused to vary as the root-mean-square (RMS) value or power in $v$ of equation (1). In FIG. 2 this is accomplished by including an RMS detector 21, the output voltage $V_c$ of which comprises the control voltage to a variable attenuator 20 interposed between phase shifter 16 and summing circuit 17. The control voltage is the equivalent of the RMS value of $v$ of equation (1) and is $$V_c = \frac{E_o}{\sqrt{2}}\left[\sum_1^N e_n^2\right]^{1/2} \qquad (8)$$

and the output of attenuator 21 is then $$E'_c = bV_c = \frac{bE_o}{\sqrt{2}}\left[\sum_1^N e_n^2\right]^{1/2} \qquad (9)$$

where
which b is a constant amplitude factor of the attenuator and will be defined hereinafter for a specific circuit. Substituting equation (9) for the phase term of equation (7) leads to $$e'_p = E'_c \sin\left[\omega_o t + \left(\frac{\sqrt{2}k}{b\left[\sum_1^N e_n^2\right]^{1/2}}\right)\sum_1^N e_n \cos \omega_n t\right] \qquad (10)$$

which shows that the modulation index is now independent of $$\left[\sum_1^N e_n^2\right]^{1/2}$$

and therefore constant. Thus, fading or loss of one or more channels does not affect the index of modulation. Amplitude variations of $e'_p$ due to $E'_c$ in the amplitude term of equation (10) are, of course, removed by limiter 18.

Figure 3:
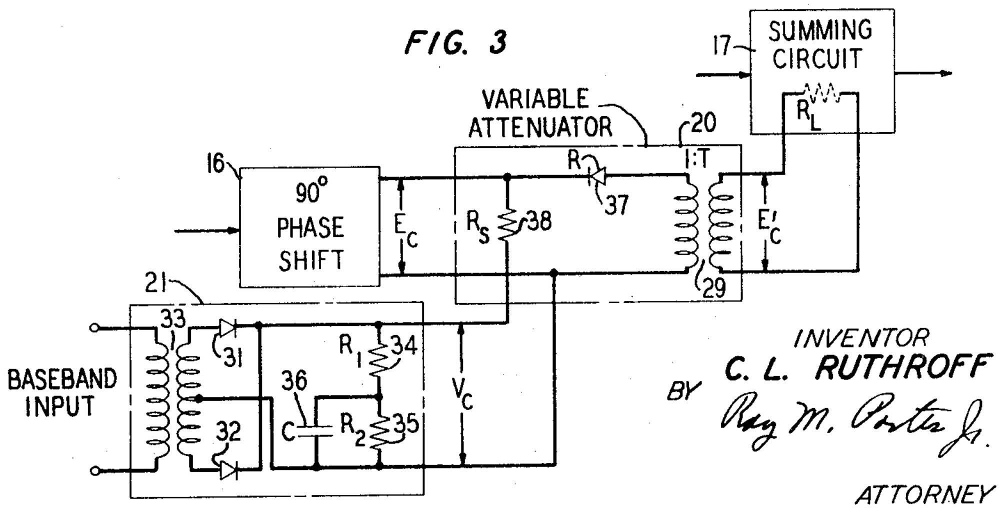
FIG. 3 gives circuit details of a particular embodiment for FIG. 2.

Having thus described the basic principles of the invention, it should be noted that components providing the requirements specified by equations (8) and (9) are very simple. This is illustrated in FIG. 3 which shows a schematic diagram of those components according to a preferred embodiment. Thus, RMS detector 21 comprises a pair of square law diodes 31 and 32 driven in push-pull by transformer 33 with their outputs connected in parallel across a pair of resistors 34 and 35 having values $R_1$ and $R_2$, respectively. A capacitor 36, forming a long time constant with $R_2$, is connected in shunt therewith. Thus, the voltage across $R_2$ represents the peak voltage and the voltage across $R_1$ represents the average voltage. It is well known, as described, for example, in the Bell System Technical Journal, July 1960, pages 925–931, that a proper selection of $R_2/(R_2+R_1)$ for a particular waveform under consideration will produce a sum voltage across $R_1$ and $R_2$ that closely approximates the RMS value of the signal applied to the input of circuit 21. For the waveform anticipated for $v$, a ratio of 0.6 is appropriate.

The output voltage $V_c$ from detector 21 is then applied as the control to variable attenuator 20 which itself comprises a PIN diode 37 connected in series in the path from phase shifter 16 to summing circuit 17 assumed to have a load resistance of $R_L$. An isolating transformer 29 having a turns ratio 1:T is preferably located between diode 37 and $R_L$ in circuit 17 in order to assure a low resistance path for the control current. A limiting resistance 38 having a value $R_S$ is located in series in the control path. If diode 37 has a resistance R which varies as a function of its current $I_D$ therethrough such that $RI_D$ equals a constant $d$, and if $R_S >> R_1+R_2$ and $R_S >> R$, it may be shown that $$E'_c \approx \left(\frac{E_c R_L}{dTR_S}\right)V_c. \qquad (11)$$

Thus, $E_c'$ varies directly as $V_c$ (the terms in the parentheses of the equation (11) corresponding to the factor $b$ in equation (9) above). Thus, $E_c'$ is directly proportional to the RMS value of $v$ as required.

It should be understood that the circuit illustrated in FIG. 3 is but one particular embodiment selected from many possible circuits which could function for RMS detector 21 and attenuator 20. A typical embodiment according to FIG. 3 can be expected to have a range of 28 db. over which the output voltage is proportional to a control voltage or RMS value in the order of 0.8 to 2 volts. Further considerations of attenuators of this type may be found in the article by W. F. Bodtmann "-Design of Efficient Broadband Variolossers", 48 Bell System Technical Journal 1687, July–Aug. 1969.

What is claimed is:

1. In combination with a frequency modulator of the type in which one portion of a carrier signal is mixed with a modulating signal and another portion is shifted in phase before combination with said mixed one portion to produce a frequency modulated sum, a plurality of intelligence signal channels some of which may periodically have low amplitudes, means for combining said channels into a composite signal to form said modulating signal, means for deriving an indication of the power in said composite signal, and means responsive to said indication for varying the relative amplitudes of said carrier portions whereby the index of modulation is maintained constant despite said periodic low levels.

2. In combination with a frequency modulator of the type in which one portion of a carrier signal is amplitude modulated by an intelligence signal and another portion is shifted in phase before combination with said amplitude modulated one portion to produce a frequency modulated sum having a modulation index, a source of said intelligence signal having a varying output level, means for deriving an indication of said output level, and means responsive to said indication for varying the amplitude of said other portion whereby said index is maintained constant despite said varying level.

3. The combination according to claim 2 wherein said indication comprises a current proportional to the root-mean-square value of said intelligence signal.

4. The combination according to claim 3 including means responsive to said current for regulating said other portion so that the amplitude of said other portion varies in proportion to said current and said root-mean-square value.

5. A frequency modulator for impressing an intelligence signal of varying level upon a carrier signal, means for dividing said carrier signal into two parts, means for varying the ratio of the amplitude level of said parts in response to the power in said intelligence signal, and means for successively combining said parts and said intelligence signal in a quadrature type frequency modulator to produce a modulated wave of relatively constant index of modulation despite said varying level intelligence signal.

6. The modulator according to claim 5 wherein one of said parts is shifted in phase by 90° to become the quadrature signal in said modulator and wherein the amplitude level of said one part is varied in response to the power in said intelligence signal.

7. A frequency modulator for impressing an intelligence signal of varying level upon a carrier signal, including means for deriving an indication of the power in said intelligence signal, means for dividing said carrier signal into two parts, means for varying the amplitude level of one of said parts in response to said indication, and means for first combining the other part with said intelligence signal and then said amplitude varied one part with the product of said other part and said intelligence signal to produce a modulated wave of relatively constant index of modulation.

* * * * *